United States Patent [19]
Lee et al.

[11] Patent Number: 5,860,448
[45] Date of Patent: Jan. 19, 1999

[54] OIL PRESSURE SUPPLY VALVE FOR A TRACTION CONTROL SYSTEM

[75] Inventors: Sang-Cheol Lee; Young-Il Kim, both of Namyangiu, Rep. of Korea

[73] Assignee: Mando Machinery Corporation, Gunpo, Rep. of Korea

[21] Appl. No.: 867,975

[22] Filed: Jun. 3, 1997

[30] Foreign Application Priority Data

Jun. 17, 1996 [KR] Rep. of Korea ..................... 96-21876

[51] Int. Cl.⁶ .................................................. F16K 31/12
[52] U.S. Cl. ............... 137/508; 137/505.13; 137/505.25; 137/509; 137/498
[58] Field of Search .......................... 137/505.13, 508, 137/509, 505.25, 492, 498

[56] References Cited

U.S. PATENT DOCUMENTS

| | | | |
|---|---|---|---|
| 1,577,731 | 3/1926 | Krueger | 137/498 |
| 1,920,040 | 7/1933 | Hooydonk | 137/498 |
| 2,217,330 | 10/1940 | Buttner | 137/497 |
| 2,219,408 | 10/1940 | Benz et al. | 137/505.13 |
| 2,821,209 | 1/1958 | Waterman | 137/498 |
| 2,835,271 | 5/1958 | Oberthur | 137/505.13 |
| 2,892,468 | 6/1959 | Beuchle | 137/505.13 |
| 3,060,959 | 10/1962 | Foster | 137/498 |
| 3,131,715 | 5/1964 | Sanders | 137/508 |
| 3,147,042 | 9/1964 | Stelzer | 137/505.25 |
| 3,519,011 | 7/1970 | Pennanen | 137/508 |
| 3,526,437 | 9/1970 | Lewis | 137/517 |
| 3,734,570 | 5/1973 | Stelzer | 137/508 |
| 3,945,686 | 3/1976 | Orzel | 137/505.25 |
| 4,191,210 | 3/1980 | Belart et al. | 137/505.13 |
| 4,664,451 | 5/1987 | Sakaguchi et al. | 137/508 |
| 4,724,866 | 2/1988 | Bates et al. | 137/498 |
| 4,785,847 | 11/1988 | Steer et al. | 137/505.25 |
| 5,107,679 | 4/1992 | Bartlett | 137/508 |

*Primary Examiner*—Henry A. Bennett
*Assistant Examiner*—Joanne Y. Kim
*Attorney, Agent, or Firm*—Staas & Halsey

[57] ABSTRACT

An oil pressure supply valve for a traction control system, the structure of which is simple and small in size, that improves the function of the traction control system by securing enough flowing volume of the brake oil. The oil pressure supply valve includes: a body; internal passages connecting a master cylinder connection passage and a pump inlet connection passage that are formed perpendicular to each other in the body; a valve operating member including a valve seat for opening and closing the internal passages; a valve element having a ball valve which contacts or separates from the valve seat; a fixing screw member which is integrally formed with the valve element; and a spring supporting the valve operating member. Also, in the fixing screw member is formed an air passage through which air passes when the valve operating member moves up and down. Rings for preventing oil leakage are provided between the valve operating member and the body, and between the valve operating member and the valve element, respectively.

2 Claims, 4 Drawing Sheets

OIL PRESSURE SUPPLY VALVE FOR A TRACTION CONTROL SYSTEM

BACKGROUND OF THE INVENTION

1. Field of the invention

This invention relates to an oil pressure supply valve, and more specially to an oil pressure supply valve for a traction control system, the structure of which is simple and small in size.

2. Description of the Prior Art

In a traction control system, in order to prevent the driving wheels from slipping when excessive driving force is transferred to them or when the car initially accelerates on a slippery road, slip signals of the driving wheels are transferred from a speed sensor installed on the driving wheels to a controller. After the controller receives the slip signals, it provides adequate braking force to the driving wheels by increasing or decreasing the driving force or reducing the engine power without depressing the brake, so that slipping of the driving wheels is prevented.

In a conventional traction control system, as shown in FIG. 1, an oil pressure supply valve 90 is provided. When a traction control system operates, because a TC (Traction Control) valve 100 is closed, the brake oil discharged from a master cylinder 20 is not supplied directly to a pump 40. Instead, the oil flows to the pump 40 via the oil pressure supply valve 90 and is supplied to a wheel cylinder 60, so that an adequate driving force is applied. But when a brake 10 is depressed, the oil pressure is not supplied to the pump 40 because the oil pressure supply valve 90 is closed, but flows to the wheel cylinder 60 via a check valve 30, so that the excessive oil pressure caused by depressing the break 10 is prevented from being transferred to the pump 40. The elements that are indicated by the numerals 50 and 70 are check valves, and 80 is a low pressure tank.

FIG. 4 shows the structure of a conventional oil pressure supply valve for a traction control system.

In a conventional oil pressure supply valve, a master cylinder connection passage 202 and a pump inlet connection passage 203 are formed perpendicular to each other in a body 201, and passages 204, 205 and 206 connect the two connection passages 202 and 203. At the lower portion of the body 201 is provided a plunger 215 supported by a spring 216, and at the top of and integrally formed with the plunger 215 is a push rod 214, which passes through the passage 205 and extends to the passage 204. A ball valve 213 provided inside the passage 204 contacts or separates from a valve seat 211 formed at the end of the passage 204 because the movement of the push rod 214 and the ball valve 213 up and down together is governed by the spring 216 and the brake oil pressure. Accordingly, the valve is opened or closed.

In such an oil pressure supply valve, when the traction control system operates, because the resilient force of the spring 216 supporting the plunger 215 is larger than the pressure of the brake oil flowing to the body 201 via the master cylinder connection passage 202, the push rod 214 of the plunger 215 is protruded inside the passage 204. This causes the ball valve 213 to separate from the valve seat 211, which reroutes the brake oil discharged from the master cylinder connection passage 202 to the pump inlet connection passage 203 via the passages 204, 205 and 206. From the pump inlet connection passage 203 the brake oil is then supplied to the wheel cylinder via the pump, thereby providing adequate driving force for preventing the driving wheels from slipping when the car is started or accelerated on a slippery road, and for controlling the cornering skid when the car drives around a corner.

However, when a driver depresses the brake because of the driving instability caused by the slipping of the driving wheels, the brake oil pressure discharged from the master cylinder passage 202 becomes larger than the resilient force of the spring 216 and presses the plunger 215 down. Therefore, the ball valve 213 contacts the valve seat 211 to block the passages 204 and 205, thereby preventing excessive oil pressure from being transferred to the pump.

When the brake pedal is then released, as the oil pressure discharged from the master cylinder connection passage 202 is reduced, the spring 216 moves the push rod 214 of the plunger 215 up. Since, the ball valve 213 separates from the valve seat 211, the brake oil discharged from the master cylinder connection passage 202 flows to the pump inlet connection passage 203 via the passages 204, 205 and 206 and is supplied to the wheel cylinder.

In a conventional oil pressure supply valve, because the push rod 214 supporting the ball valve 213 is located inside the passage 205, the flowing volume of the brake oil to the pump is relatively small. To solve this problem, the diameter of the passage 205 can be made larger, but as the passage 205 gets larger, the ball valve 213 and the valve seat 211 must also increase in size. Therefore, a conventional oil pressure supply valve has a disadvantage in that the external shape of the valve becomes large and the structure complicated, when it is made large enough to properly accommodate the brake oil flow necessary for braking.

SUMMARY OF THE INVENTION

This invention is devised to solve the aforementioned problems. The object of this invention is to provide an oil pressure supply valve for a traction control system, the structure of which is simple and small in size, that improves the function of the traction control system by securing sufficient flowing volume of the brake oil.

To achieve the above object, an oil pressure supply valve for a traction control system according to the present invention comprises: a body, a master cylinder connection passage and a pump inlet connection passage formed perpendicular to each other in the body, internal passages connecting the master cylinder connection passage and the pump inlet connection passage, a valve operating member including a valve seat for opening and closing the internal passages, a spring supporting the valve operating member, a valve element at the end of which a ball valve is fixed for contacting or separating from the valve seat, and a fixing screw member integrally formed with the valve element. Also, in the fixing screw member is formed an air passage through which air passes when the valve operating member moves up and down. Rings for preventing oil leakage are provided between the valve operating member and the body, and between the valve operating member and the valve element, respectively.

BRIEF DESCRIPTION OF THE DRAWINGS

FIG. 2a shows the open state of the valve, and FIG. 2b shows the closed state of the valve.

FIG. 3a shows the open state of the valve, and FIG. 3b shows the closed state of the valve.

DETAILED DESCRIPTION OF THE INVENTION

The preferred embodiments of the present invention will be now described in detail referring to the attached drawings.

Figure 1:
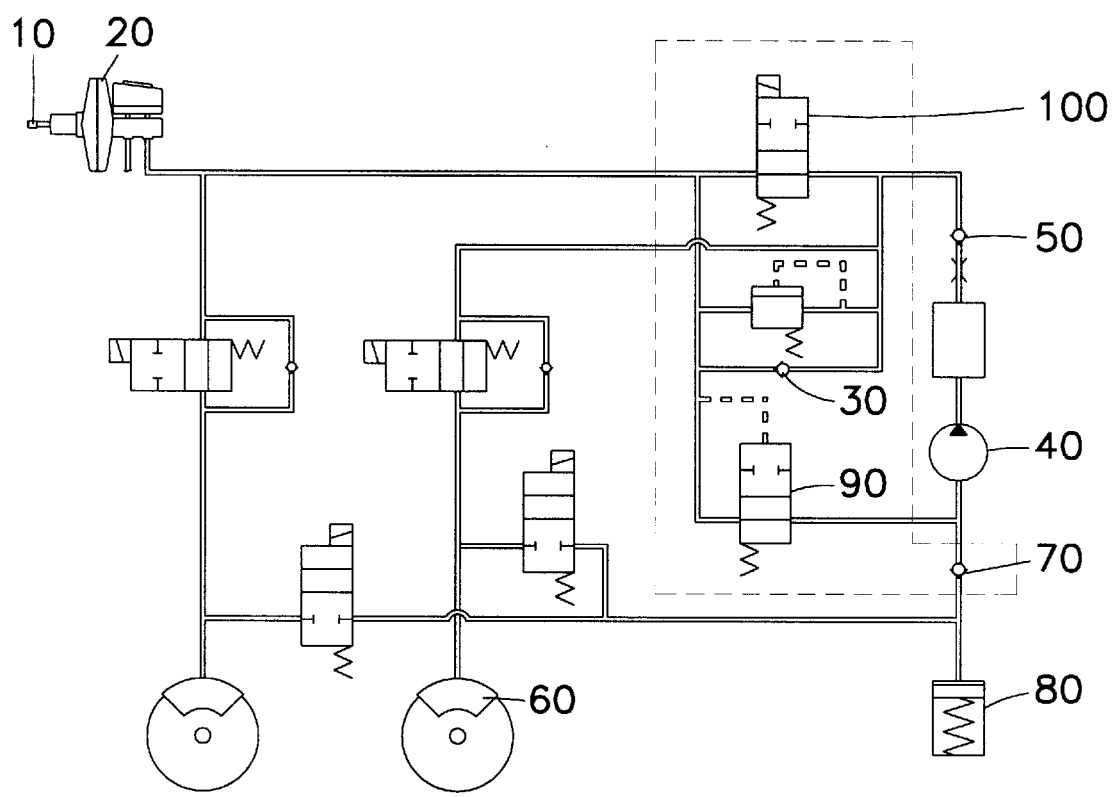
FIG. 1 shows the general structure of a traction control system.
Figure 2A:
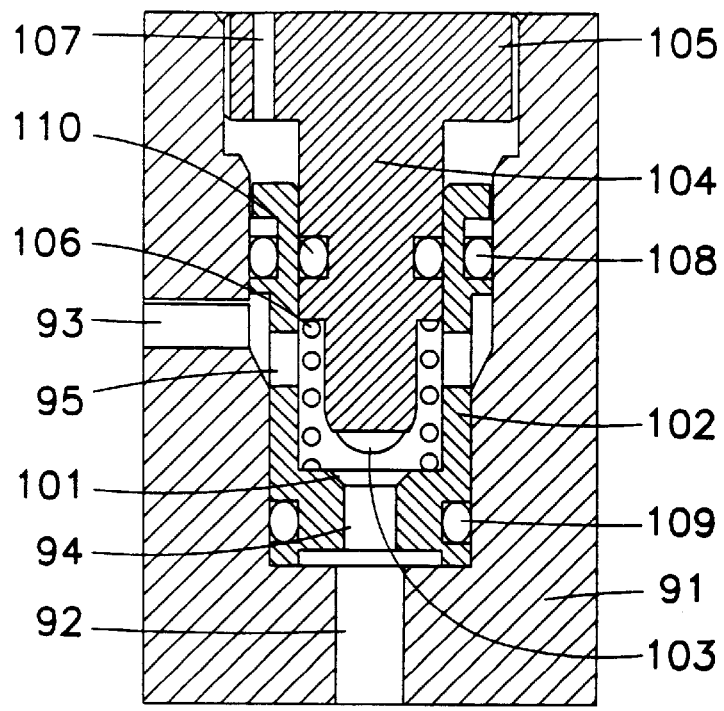
FIGS. 2a and 2b are cross-sectional views showing the structure of an oil pressure supply valve for a traction control system according to the first embodiment of this invention.
Figure 2B:
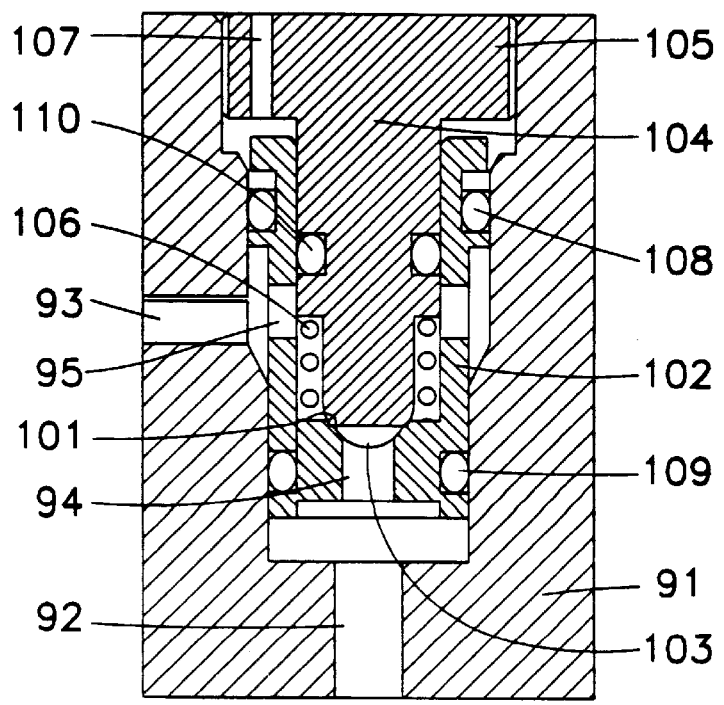

FIGS. 2a and 2b are cross-sectional view showing the structure and operating state of an oil pressure supply valve for traction control system according to the first embodiment of this invention.

The oil pressure supply valve of this invention comprises: a body 91, a master cylinder connection passage 92 and a pump inlet connection passage 93 formed perpendicular to each other in the body 91, internal passages 94 and 95 connecting the two connection passages 92 and 93, a valve operating member 102 that includes a valve seat 101 for opening and closing the internal passages 94 and 95, a valve element 104 at the end of which a ball valve 103 is fixed for contacting or separating from the valve seat 101, and a fixing screw member 105 integrally formed with the valve element 104. Also, a spring 106 provided between the valve operating member 102 and the valve element 104 supports the valve operating member 102. In the fixing screw member 105 is formed an air passage 107 through which air passes when the valve operating member 102 moves up and down. Rings 108, 109 and 110 for preventing oil leakage are provided between the valve operating member 102 and the body 91, and between the valve operating member 102 and the valve element 104, respectively.

In such an oil pressure supply valve, as shown in FIG. 2a, when the traction control system operates, the spring 106 separates the valve seat 101 from the valve element 104. Accordingly, the brake oil discharged from the master cylinder connection passage 92 flows to the pump inlet connection passage 93 via the internal passages 94 and 95, and is supplied to the wheel cylinder via the pump. This provides an adequate driving force for preventing the driving wheel from slipping when the car is started or accelerated on a slippery road, and for controlling the cornering skid when the car drives around a corner.

However, when a driver depresses the brake because of the driving instability caused by the slipping of the driving wheel, as shown in FIG. 2b, the pressure of the brake oil discharged from the master cylinder passage 92, which is larger than the resilient force of the spring 106, pushes the valve operating member 102 upward. Therefore, the valve element 104 and the ball valve 103 contact the valve seat 101 of the valve operating member 102 to close the passages 94 and 95, thereby preventing excessive oil pressure caused by depressing the brake from being transferred to the pump.

When the brake is released, as the brake oil pressure discharged from the master cylinder connection passage 92 is reduced, the spring 106 moves the valve seat 101 down. Because the valve element 104 and the ball valve 103 separate from the valve seat 101 of the valve operating member 102, the brake oil discharged from the master cylinder connection passage 92 flows to the pump inlet connection passage 93 via the passages 94 and 95, and is again supplied to the wheel cylinder via the pump.

Figure 3A:
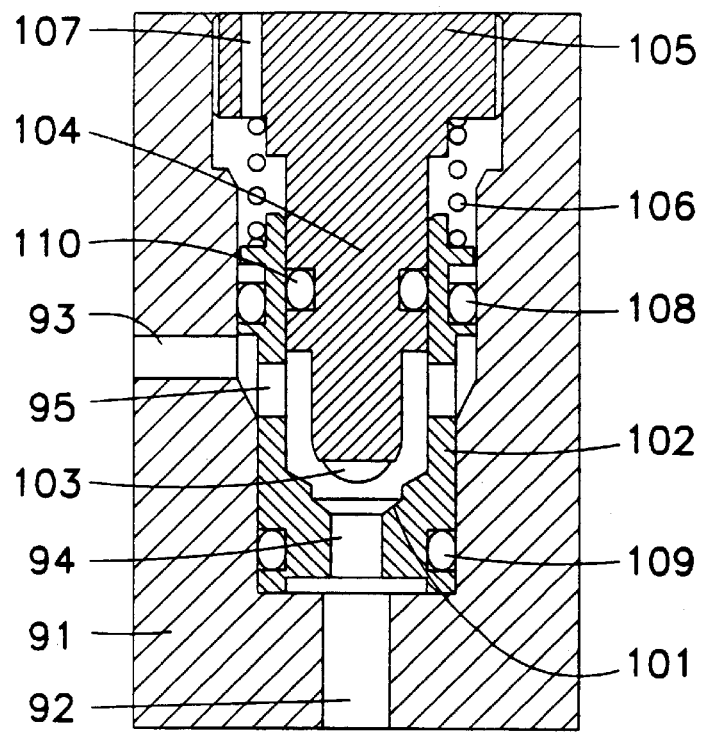
FIGS. 3a and 3b are cross-sectional views showing the structure of an oil pressure supply valve for traction control system according to the second embodiment of this invention.
Figure 3B:
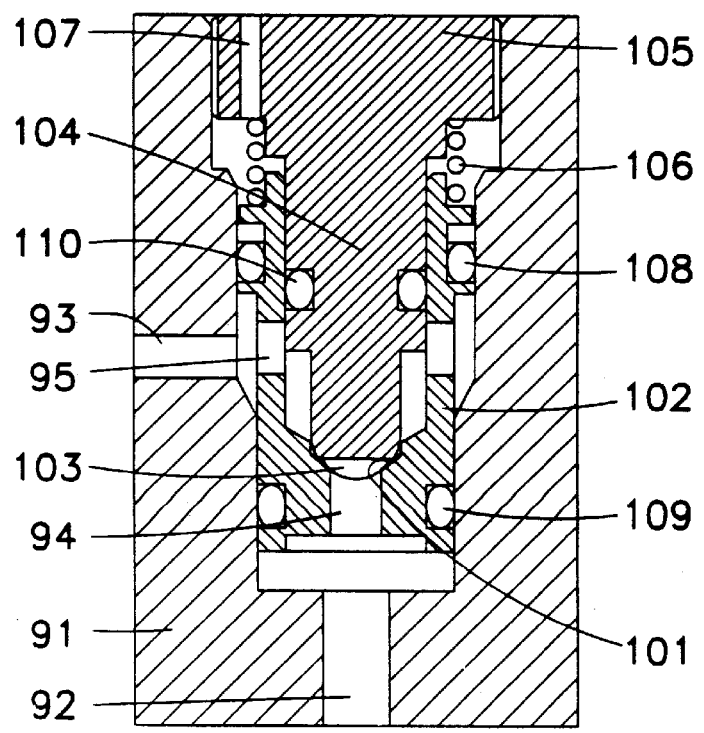
Figure 4:
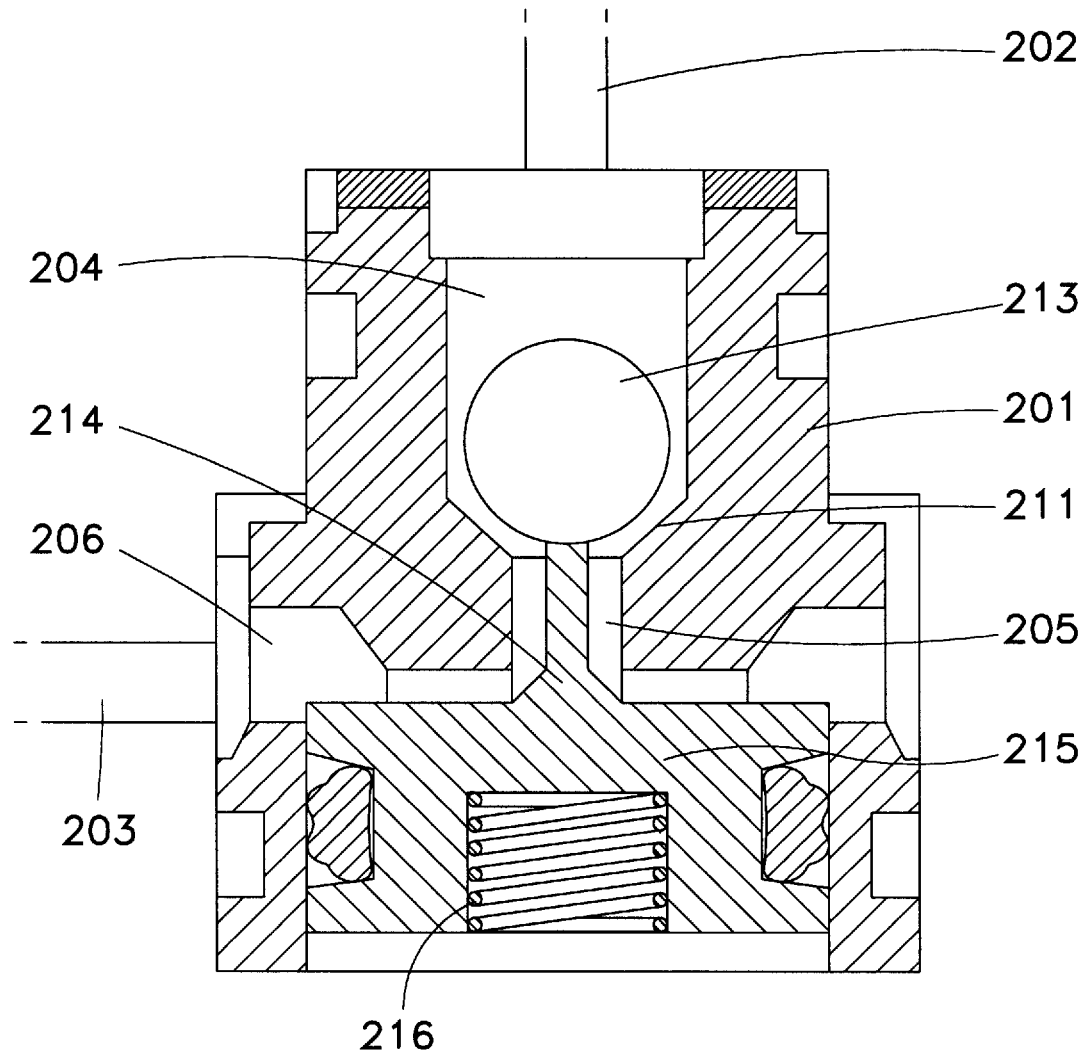
FIG. 4 is a cross-sectional view showing the structure of a conventional oil pressure supply valve.

FIGS. 3a and 3b show the second embodiment of this invention, in which the same elements as those in FIGS. 2a and 2b are indicated by the same numerals and the detailed explanation will be omitted.

The structure shown in FIGS. 3a and 3b is same as that shown in FIGS. 2a and 2b with the exception of the spring 106 being provided between the valve operating member 102 and the fixing screw member 105. The operation of the valve by the spring 106 is same as that aforementioned in FIGS. 2a and 2b.

As discussed above, an oil pressure supply valve for the traction control system of this invention is characterized in that passages connecting a master cylinder and a pump are opened or closed as a valve operating member moves up and down. The structure of the oil pressure supply valve is simple and small in size, yet it enhances the function of the traction control system by securing sufficient flowing volume of the brake oil.

What is claimed is:

1. An oil pressure supply valve for a traction control system, comprising:

a body;

a plurality of internal passages connecting a master cylinder connection passage and a pump inlet connection passage that are formed perpendicular to each other in said body;

a valve operating member with a valve seat which opens or closes said internal passages;

a valve element having a ball valve which contacts or separates from said valve seat;

a fixing screw member integrally formed with said valve element and has an air passage therein; and a spring provided between said valve operating member and said valve element to support said valve operating member;

wherein said spring moves said valve seat up and down to contact or separate from said valve element, thereby opening or closing said plurality of internal passages.

2. An oil pressure supply valve for a traction control system according to claim 1, wherein said spring is provided between said valve operating member and said fixing screw member.

* * * * *